United States Patent [19]

Harden et al.

[11] 4,252,587
[45] Feb. 24, 1981

[54] FRICTION WELDING MACHINE AND METHOD FOR ASSEMBLING POLYSTYRENE SPOOL

[75] Inventors: David R. Harden, Washington, Pa.; Hugh E. Southerland, Connelly Springs, N.C.

[73] Assignee: Piedmont Wire Corporation, Connelly Springs, N.C.

[21] Appl. No.: 42,814

[22] Filed: May 29, 1979

[51] Int. Cl.³ .......................................... B29C 27/08
[52] U.S. Cl. .................................. 156/73.5; 156/358; 156/556; 156/580; 228/2; 228/112; 242/118.7; 264/68; 264/248
[58] Field of Search ................ 156/73.5, 580, 69, 294, 156/358, 556; 228/2, 112; 242/118.4, 118.7; 264/68, 248

[56] References Cited

U.S. PATENT DOCUMENTS

| 3,595,462 | 7/1971 | Hirayama | 156/73.5 |
| 3,743,162 | 7/1973 | Gage | 156/73.5 |
| 3,800,995 | 4/1974 | Franks et al. | 156/73.5 |
| 3,954,215 | 5/1976 | Takagi et al. | 156/73.5 |
| 3,980,248 | 9/1976 | Minoshima | 156/73.5 |
| 4,090,898 | 5/1978 | Tuskos | 156/73.5 |

Primary Examiner—Michael G. Witshyn
Attorney, Agent, or Firm—Buell, Blenko, Ziesenheim & Beck

[57] ABSTRACT

A machine for assembling a polystyrene spool by friction welding polystyrene end flanges (in the form of discs) to the polystyrene cylindrical sleeve or barrel of a spool, used for holding wire or cable wound thereon. The machine comprises a pair of coaxially spaced rotary mandrels, driven by respective motors, on which the end flange discs are first manually mounted, and a pair of cradle members for supporting a cylindrical sleeve in coaxial relation between the two mandrels. A control system is provided for initiating rotation of the mandrels with the end flanges, then causing inward movement of the mandrels toward the opposite ends of the sleeve with a predetermined air pressure to cause softening of a stepped shoulder on the end of the central polystyrene hub of the end flanges. Rotation of the end flanges is immediately stopped upon a predetermined inward movement of the mandrels toward each other to cause the end flanges to become attached to the sleeve on cooling, by the solidification of the polystyrene of the end flanges and sleeve.

5 Claims, 10 Drawing Figures

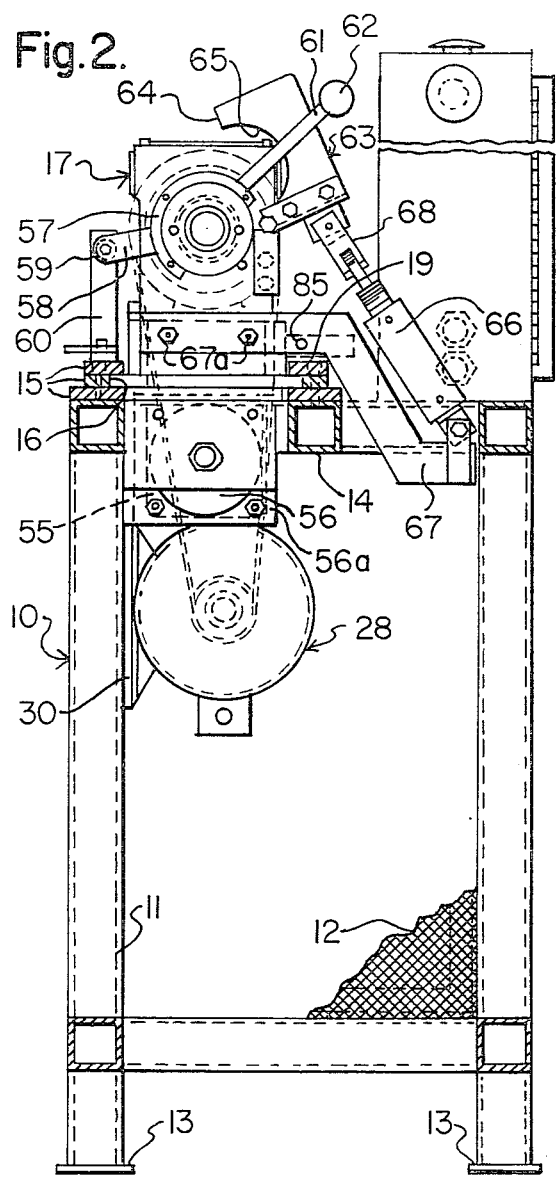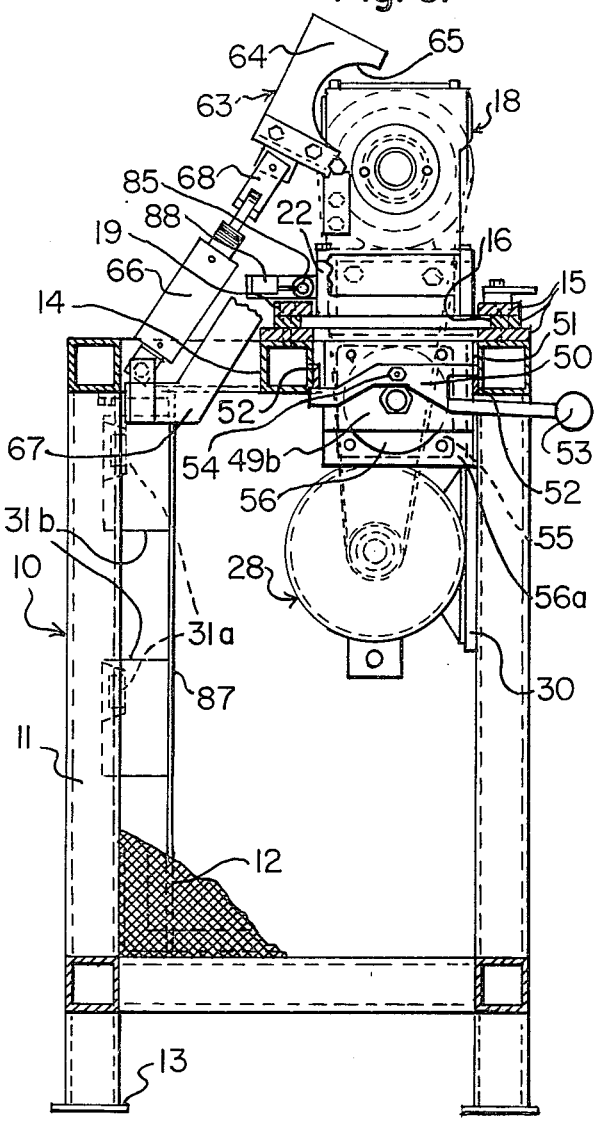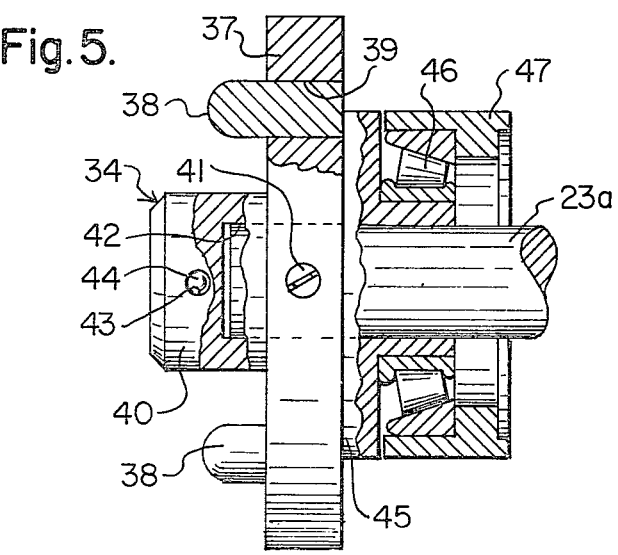

FRICTION WELDING MACHINE AND METHOD FOR ASSEMBLING POLYSTYRENE SPOOL

This invention relates to a relatively simple and low cost machine for manufacturing wire holding spools or reels made of polystyrene (plastic) material, utilizing a friction welding method to bond the end flanges or discs to the intervening sleeve or barrel.

The manufacture of wire holding spools made of polystyrene material is known, where the assembling and bonding of the end flanges to the intervening sleeve is accomplished by bonding agents, such as solvents. However, the use of solvents for this purpose is limited to large scale production and involves some danger to personnel because of the flammable character of the solvents. It is known also to perform the operation of bonding the end flanges to the sleeve by a process involving ultrasonic vibration. The use of ultrasonic vibration is objectionable because of the effect of the ultrasonic vibration on the hearing and nervous system of workers involved in the assembly process.

It is the object of this invention to provide a relatively simple and low cost machine for bonding the parts of the polystyrene spool together in a manner to avoid the health hazards and other disadvantages of prior known machines and methods.

We accordingly provide a machine having two coaxially spaced rotary mandrels, respectively driven by motors, on which two polystyrene end flanges, in the form of discs, are mounted in parallel relation to each other. While the mandrels are rotated at a relatively low speed, they are moved under fluid (air) pressure toward each other and into frictional contact with the opposite ends of a polystyrene cylinder or sleeve that is suitably supported in position. We further provide microswitch means, responsive to a predetermined movement of the mandrels toward the sleeve, for effecting the instantaneous release of the fluid pressure and the cessation of rotation of the mandrels. A control system is provided for performing a sequence of various mechanical functions of the machine automatically, once the cycle is manually initiated. Our invention is described in greater detail hereinafter in connection with the accompanying drawings, wherein:

FIG. 2 is a sectional view, taken on the line II—II of FIG. 1, FIG. 3 is a sectional view, taken on the line III—III of FIG. 1.

Figure 4:
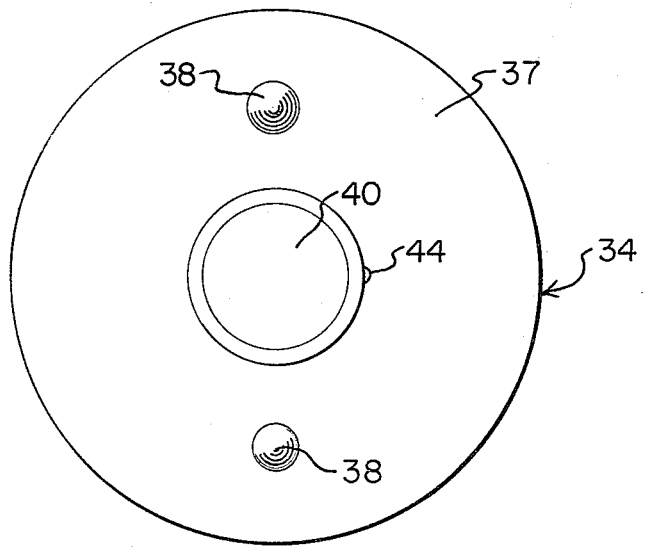
FIG. 4 is a front elevation view of a mandrel, on enlarged scale with respect to that of FIGS. 1-3.
Figure 6:
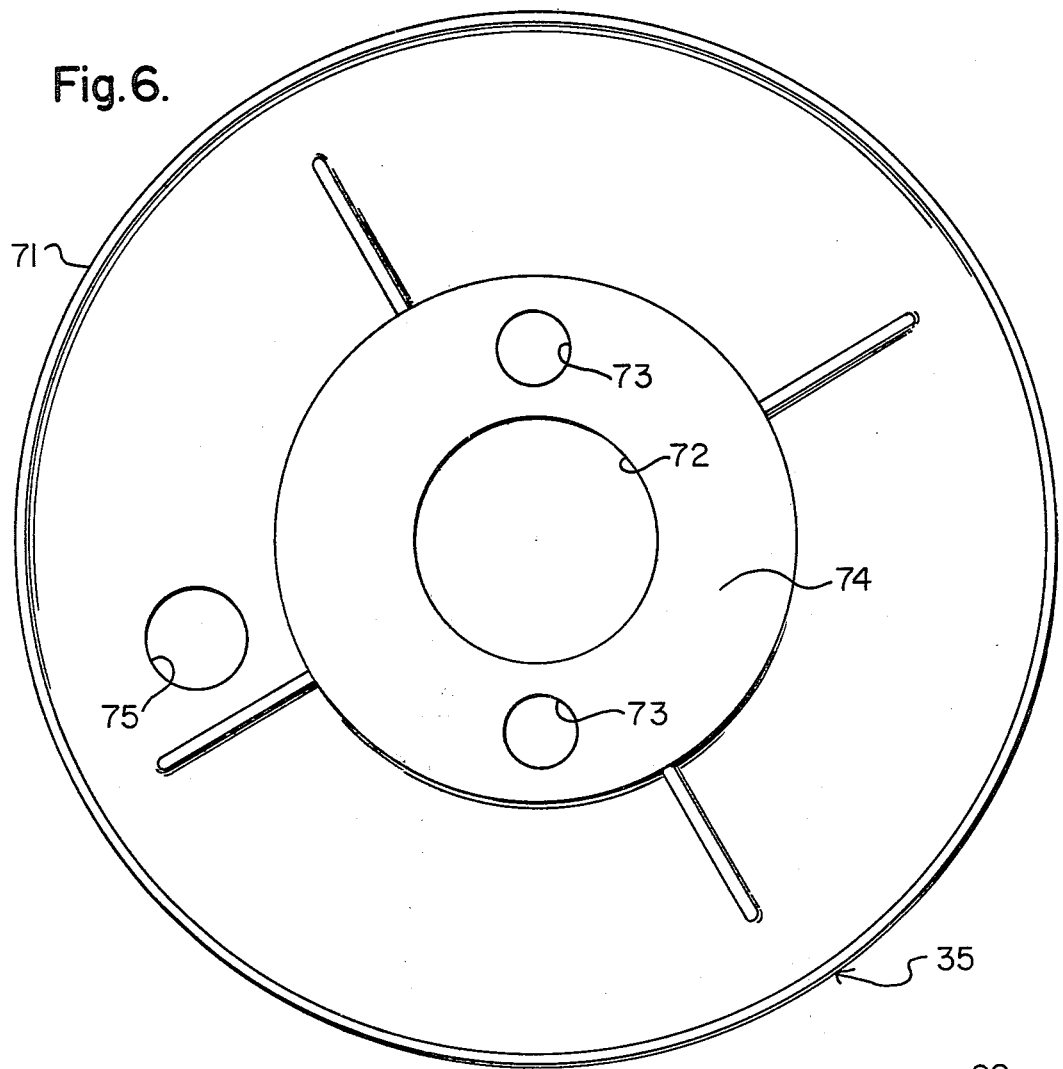
Figure 7:
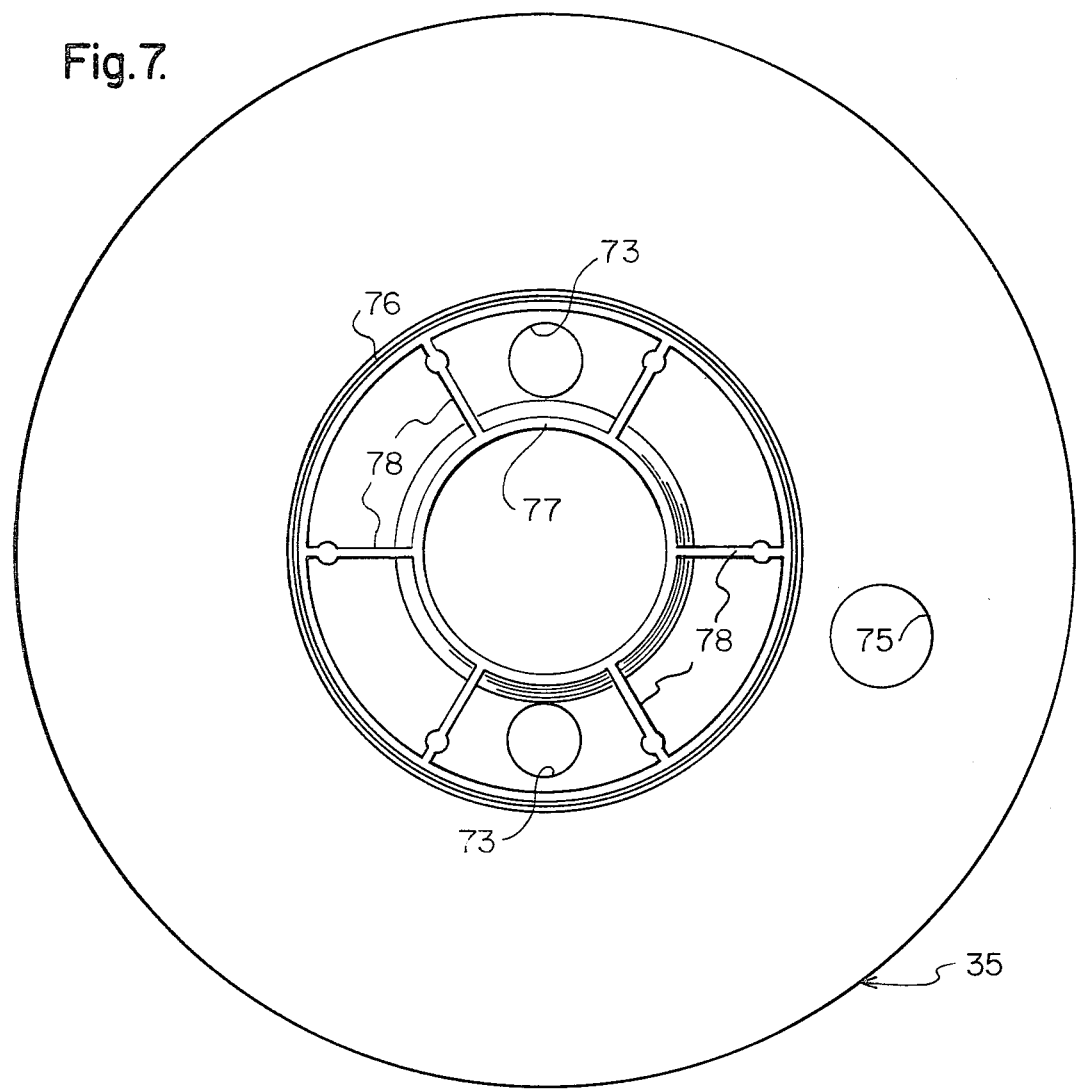
Figure 8:
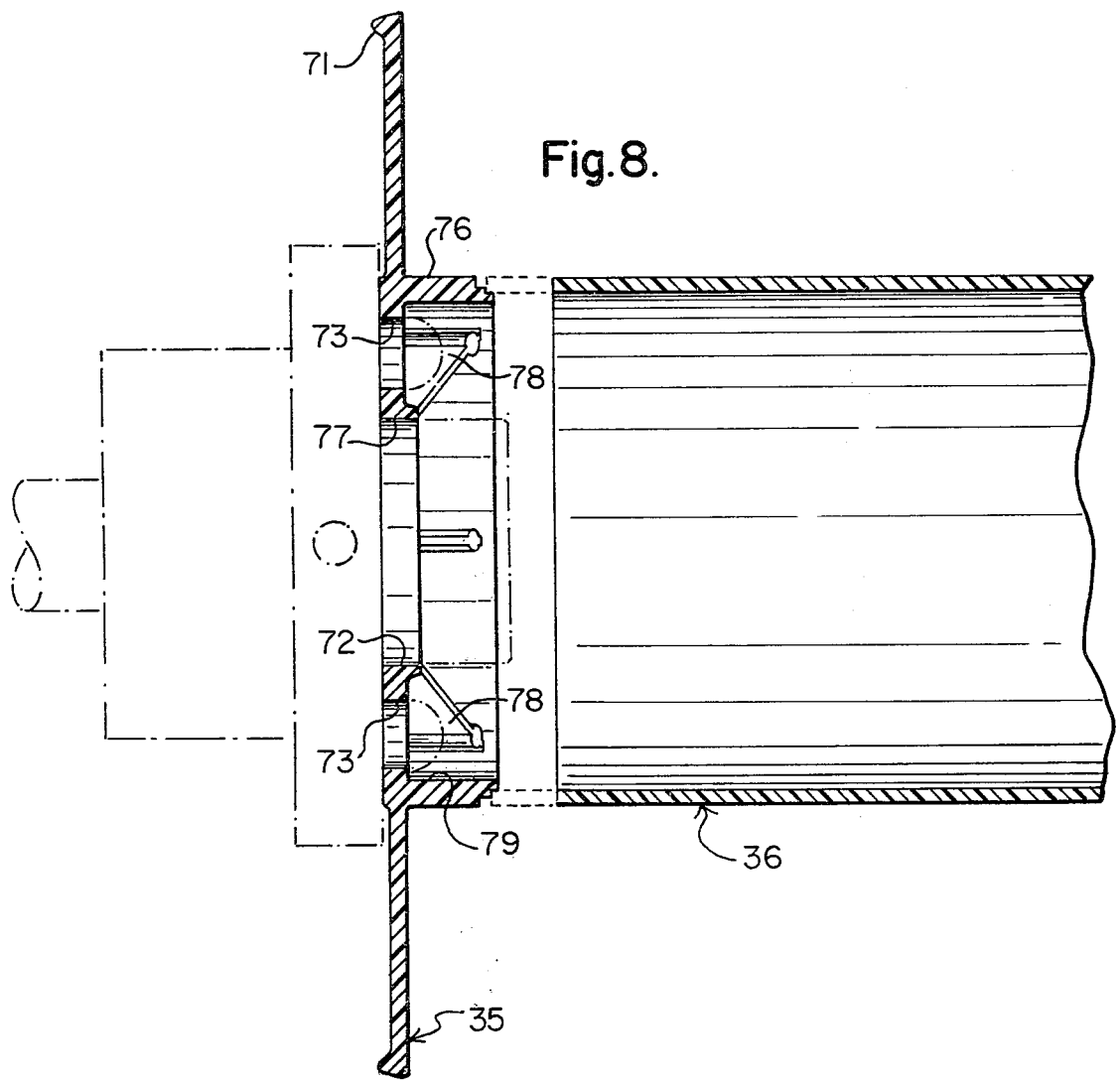
Figure 9:
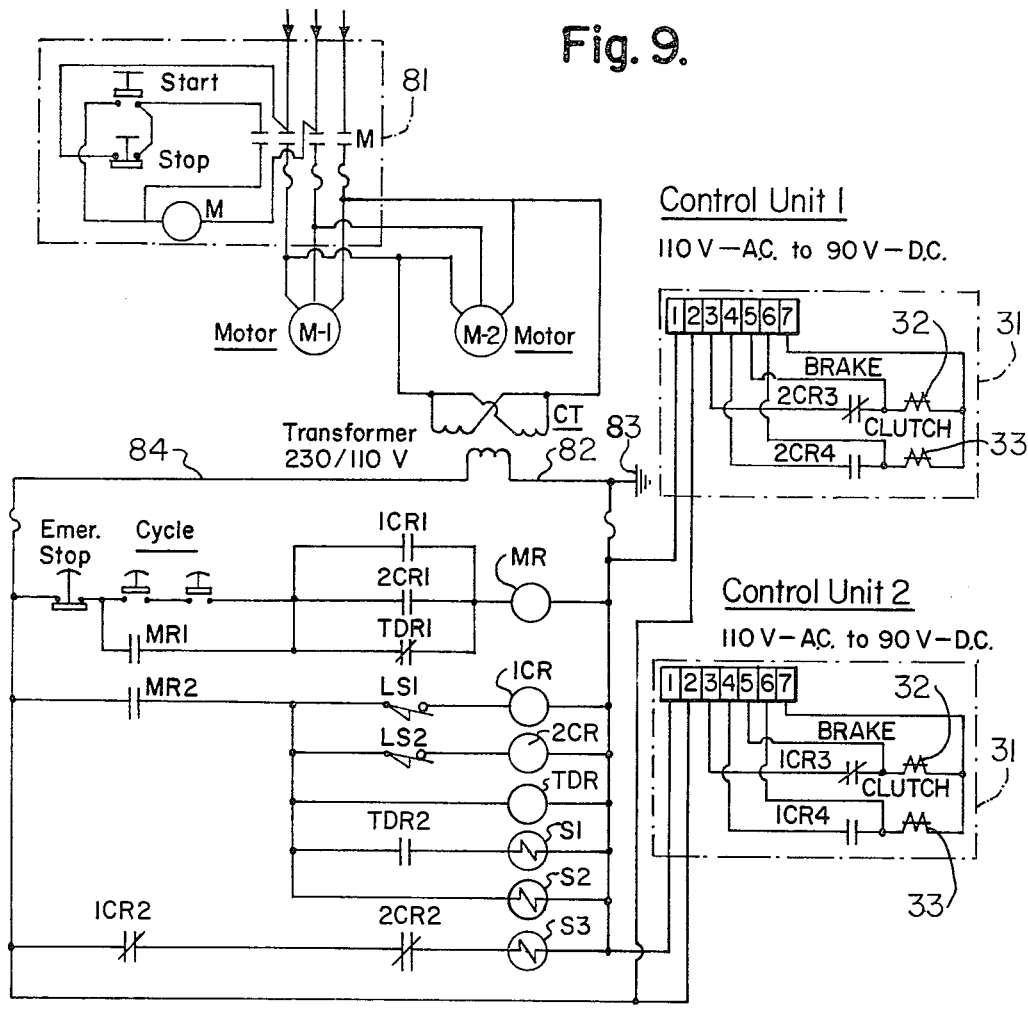

FIG. 5 is a side elevational view of the mandrel shown in FIG. 4, shown partially in section, FIG. 6 is a view, prior to assembly, of the outer face of polystyrene disc, which forms the flange at opposite ends of the spool, FIG. 7 is a view of the inner face of a polystyrene disc, opposite to that of FIG. 6, showing the central hub which projects from the face of the disc, FIG. 8 is a sectional view of the disc shown in FIG. 7, as mounted on a mandrel (indicated in phantom view) and showing a fragment of a sleeve in juxtaposition to the hub on the disc for attachment thereto, FIG. 9 is a diagram of the control apparatus and equipment for initiating operation of the welding machine and effecting automatically a sequence or cycle of operation.

Figure 1:
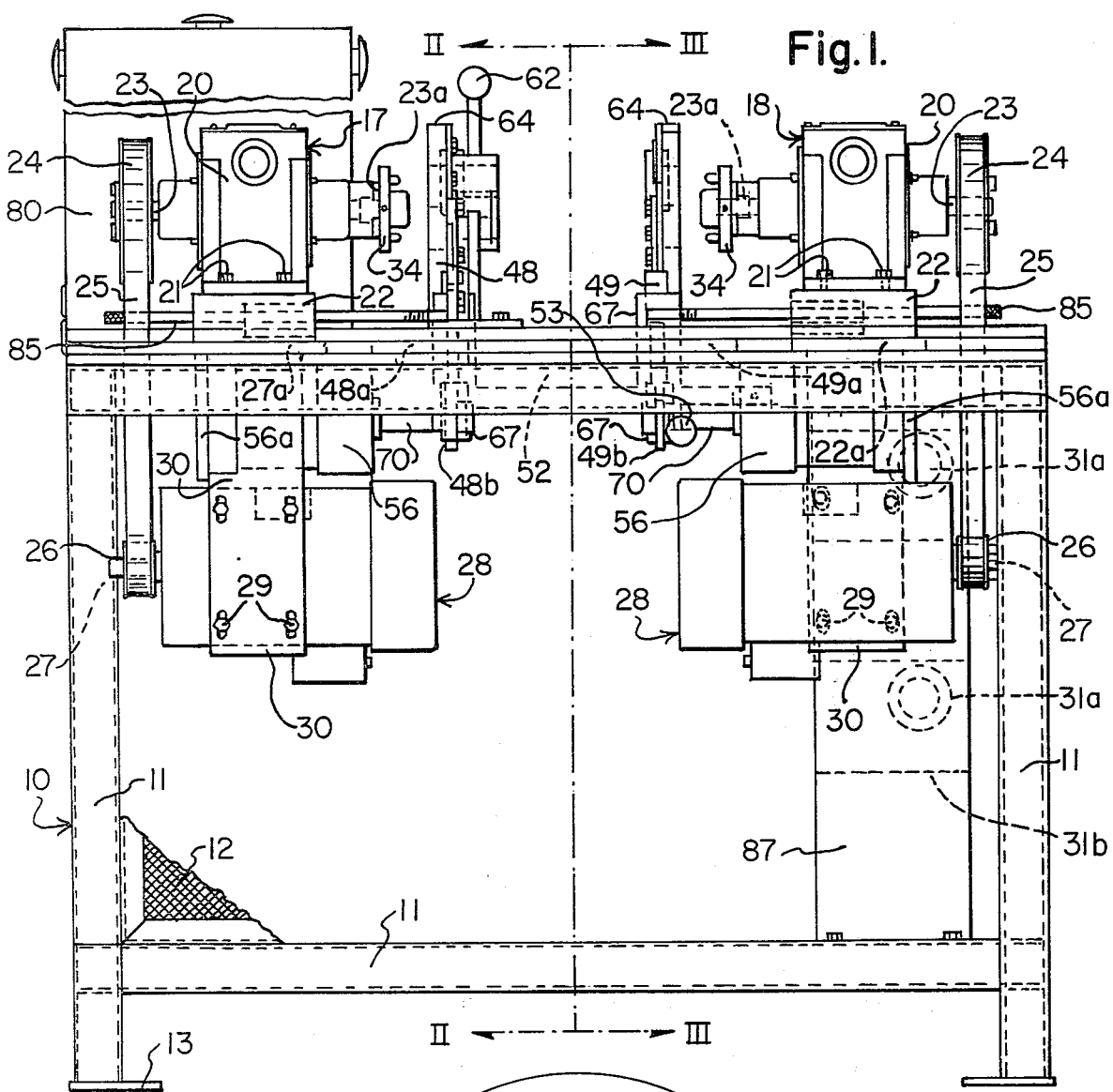
FIG. 1 is a front elevational view of a preferred embodiment of a friction welding machine constituting our invention.
Figure 3A:
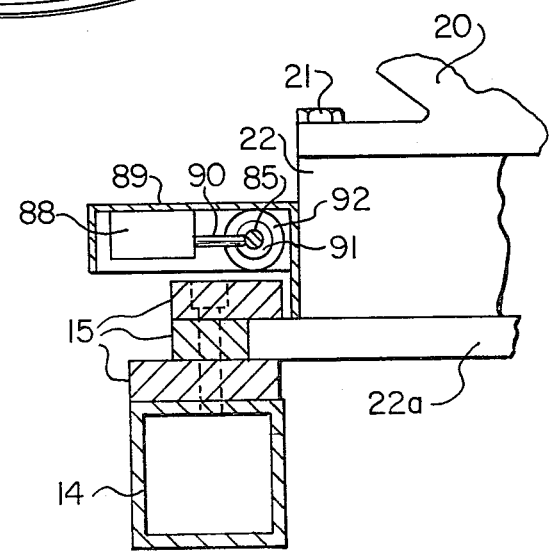
FIG. 3A is an enlarged fragmentary view, corresponding to a part of FIG. 3, showing in greater detail the means for operating the microswitches constituting part of the control system.

Referring to the drawings, particularly FIGS. 1, 2 and 3, there is shown a preferred embodiment of our invention which is a friction welding machine. The machine comprises a table or cabinet 10 having a rectangular frame made of metallic structural members 11, suitably joined as by welding or riveting. The structural members are shown by way of example as of hollow square cross section. The sides and ends of the frame are open but are closed by framed members 12 of wire mesh removable attached to the frame.

The bottom ends of the upright structural members are provided with suitable fittings which serve as feet 13 for mounting or attaching the cabinet to the floor or ground.

Within the rectangular opening formed by the structural members 11 at the top of the cabinet is a logitudinally extending structural member 14 attached at its opposite ends to the cross members 11 of the frame and positioned in parallel spaced relation to one of the longitudinally extending side frame members 11.

Attached to the structural member 14 and the parallel extending member 11 of the frame or cabinet are three longitudinal members or strips 15 arranged in staggered relation so as to form a groove 16. The parallel spaced grooves 16 form a track or guideway 19 in which a pair of mandrel assemblies 17 and 18, may move longitudinally as explained more fully hereafter. Each of the mandrel assemblies comprises a central housing 20 attached as by bolts 21 to a platform or base 22, in turn attached to a subplate 22a that slides in the track formed by the parallel longitudinally extending grooves 16.

At the opposite ends of the central housing 20 of each mandrel assembly are bearings through which rotary shafts 23 and 23a respectively extend. On the outer end of the shaft 23 of each mandrel assembly is fixed a pulley 24 that is connected by a belt 25 to a smaller pulley 26 fixed on the end of the shaft 27 of an electric motor 28. The ratio of diameters of the pulleys 24 and 26 is such that the speed of shaft 23 is relatively low, in the range of 300-324 R.P.M. Moreover, the motors 28 are mounted so as to drive their respective shafts 23 in opposite directions.

Each motor has a base which is adjustably attached, as by bolts 29, to a vertically extending bracket in Plate 30 that is in turn attached at its upper end, as by welding to the under side of the subplate 22a. Slots are provided in the plate so to enable adjustment of the bolts therein.

The central housing 20 of each mandrel assembly, embodies a Warner Electric Co. (Model MCS103) Control Unit 31 (FIG. 9) hereinafter referred to in connection with the description of the control diagram shown in FIG. 9.

For the present it will suffice to say that the control unit 31 embodies an electric brake 32 and an electric clutch 33 (FIG. 9). Clutch 33 operates when energized to couple shaft 23 to shaft 23a at the opposite end of housing 20. Brake 32 is effective when energized to apply a braking force to shaft 23a but not to shaft 23. Forming part of each control unit 31 is a rheostat 31a for controlling or regulating the voltage for applying the brake 32 of the corresponding unit. The two rheostats 31a are shown in broken lines at the back of the machine 10 (FIG. 1) and are carried in housings 31b attached to a supporting panel or plate 87. Plate 87 extends vertically and is attached at top and bottom ends to the cross members of the frame (FIG. 3).

Attached on the end of the rotary shaft 23a of each of the mandrel assemblies 17 and 18 is a mandrel 34, shown in detail in FIGS. 4 and 5. As described hereafter the mandrel 34 is designed to support thereon a flange or disc 35 (see FIGS. 6 and 7) which when friction welded to the opposite ends of a central barrel or sleeve 36, (FIG. 8), as hereinafter described, form a spool or reel on which to wind wire and cable.

Referring to FIGS. 4 and 5 each mandrel 34 comprises a metallic disc 37, having a pair of diametrically arranged parallel-extending pins or dowels 38 which are secured, as by a press fit, in holes 39 of conforming diameter. On one face of the disc 37 is a central cylindrical extension 40 which is preferably integral with the disc 37 but which may be suitably attached thereto as by welding. The outer periphery of the extension 40 is beveled for a reason hereafter made clear.

The disc 37 is attached to the end of shaft 23a by a screw 41 that screws radially inward in a tapped hole in the disc 37, into engagement with shaft 23a. Shaft 23a extends into an axial bore 42 in the disc 37 which terminates short of the outer end of the extension 40.

The extension 40 has a diametral stepped bore 43 near the end thereof in which a metal ball or ball bearing 44 is lodged so that the ball bearing seats on an annular shoulder in the bore 43 and a portion thereof projects radially from the surface of the extension 40. A small helical spring (not shown) located within the bore 43 biases the ball bearing outwardly. The ball bearing serves as a latch to lock a collar on disc 35 in seated position on the extension 40 of the mandrel 34 as hereinafter additionally described.

As will be seen in FIG. 5, the disc 37 of each mandrel has an integral hub 45 on the face opposite extension 40 by which the mandrel is rotatably mounted through a tapered thrust bearing 46 in a sleeve 47 forming part of and attached to the central housing 20.

In order to support a barrel or sleeve 36 (FIG. 8) of polystyrene material, in a horizontal coaxial position between the two flanges or discs 35 as mounted on the axially spaced mandrels 34 on mandrel assemblies 17 and 18, a pair of cradle members 48 and 49 are provided. Each cradle member comprises a vertically extending plate having a semi-circular recess at the top closely conforming to the diameter of the polystyrene sleeve to be welded to the end flanges. The vertical plate is attached as by welding to a base member 48a and 49a, respectively, that slides in the grooves of track 19. One of the cradle members namely cradle member 48 (FIG. 1) is fixed in a position across the guideway or track 19 formed by the parallel longitudinally extending grooves 16 as by a screw through a hole in the base member 48a engaging a tapped bore in a structural member 11 of the frame. Cradle member 49 is adjustably fixed or latched in different positions relative to cradle member 48 in the guideway formed by the parallel spaced grooves 16 in which the mandrel assembly 18 is guided depending on the length of the sleeve to be welded. The cradle member 49 is adjustably latched in position in longitudinally spaced relation to the cradle member 48 by a bifurcated latch lever 50, the arms of which respectively engage in longitudinally spaced slots 51 (FIG. 3) in a pair of parallel longitudinally extending locking bars 52 (FIGS. 1 and 3) attached to members of the frame. Latch lever 50 has an extension with a ball 53 (FIG. 3) on the end thereof for ease of grasping.

Latch lever 50 is pivotally mounted on a pin or screw 54 attached in a bracket or plate 49b that is dependingly attached to the underside of the base 49a forming part of the cradle member 49.

For assisting in positioning a length of sleeve 36 in the cradle members 48 and 49, a substantially semi-circular gripping member 57 is provided, the ends of which are of slightly decreased radius to pinch the sleeve 36 therebetween. The gripping member 57 has a finger 58 attached thereto and extending radially therefrom, as shown in FIG. 2, the outer end of which is pivotally mounted, as on a pin 59 carried in the upper end of a post member 60 attached to the frame. Also attached to the gripping member 57 in a position extending radially therefrom is an arm 61 having a ball 62 on the end thereof. When the arm 61 is swung downwardly in a counterclockwise direction, from the position in which it is shown in FIG. 2, the face of the gripping member 57 is turned up to receive the sleeve 36. Though the gripping member holds the sleeve at diametral points only thereof, the sleeve is of such light weight that it remains in a horizontal position when the arm 61 is swung upwardly in a clockwise direction, as viewed in FIG. 2, to the position shown therein. In this position of the arm 61, the sleeve 36 is deposited in the semi-circular recesses of the cradle members.

In order to hold the sleeve 36 firmly in a position aligned with the flanges mounted on the spaced mandrels 34 while in the cradle members, a pair of longitudinally spaced, pneumatically operated clamps 63 (FIGS. 2 and 3) are provided. The clamps are similar and each comprises a jaw member 64 having a semi-circular opening 65 conforming closely to the diameter of the sleeve 36, which is pivotally swung to a position encircling the sleeve 36 by an air cylinder 66. One end of the air cylinder 66 is pivotally mounted on a bracket 67 attached as by bolts 67a to the vertical plate of cradle member 48 (or 49), while the distal end of a piston rod 68 is pivotally connected to the jaw member 64. The jaw member is pivoted at its lower point to a corresponding one of the cradle members 48 and 49. Thus, when air pressure is supplied to the air cylinder 66, the jaw member 64 is swiveled into encircling clamping relation to the sleeve while the sleeve is supported in the cradle members 48 and 49. With both clamps 63 in the clamping relation thereto, the sleeve 36 is thus firmly held against axial rotation in position for bonding of the flanges 35 to the ends thereof by friction welding in the manner to be described hereinafter.

In order to effect friction welding of the flanges 35 to a sleeve 36, the flanges must be rotated while being pressed to the ends of the sleeve 36 under a controlled pressure. We provide for application of the flanges to the sleeve under pressure by movement of the mandrel assemblies 17 and 18 toward each other. Referring to FIGS. 1, 2 and 3, it will be seen that an air cylinder 56 is mounted below each of the mandrel assemblies 17 and 18 on a vertically depending bracket plate 56a attached to the underside of the subplate 22a of the mandrel assemblies. Air cylinders 56 are of the double acting type. One of the air cylinders 56 that is attached to the base 22 of mandrel assembly 18, has its piston rod 70 fixedly attached at the end thereof, as by nuts, to the vertical plate of the associated cradle member 49. The other air cylinder 56 that is attached to the base 22 of the mandrel assembly 17 has the end of its piston rod 70 anchored, as by nuts, to the vertical plate of the fixed cradle member 48.

It will be seen that upon the supply of air under pressure in the range of 80–100 p.s.i. to one side of the double acting piston in the air cylinder, the reaction of the air pressure against the stationary piston causes the body of the cylinder to move and carry with it the mandrel assembly which it is attached in a direction to press the flange, carried on the mandrel 34, against the corresponding end of the sleeve 36. It will be understood also that since the motors 28 are fixed in position with respect to the central housing 20 of the mandrel assemblies, the mandrels 34 are rotatable at the same time they are moved under pressure.

Referring to FIGS. 6, 7 and 8 the flanges 35 and their relation to the sleeve 36 will now be described. The flange 35 comprises a flat disc body of polystyrene (plastic) material and of appropriate thickness, such as 1/16 of an inch, to impart required rigidity thereto. The diameter may vary according to the holding capacity of the spool desired. The outer face of the flange, as shown in FIG. 6, has a narrow rim 71 of somewhat greater thickness than the flat body to provide the necessary stiffness to the rim. Centrally of the body of the disc is a circular hole 72 and two smaller holes 73 diametrically arranged on opposite sides of the hole 72. An annular boss 74 of increased thickness surrounds the central hole 72. One or more additional holes 75 may be provided in the body of the disc, between the boss 74 and the rim 71, for passing an end of wire through the flange.

The inner face of the body of the disc has a short hub 76 projecting axially therefrom in coaxial surrounding relation to the hole 72. A relatively narrow annular rim 77 extends axially from the hole 72 to provide a surface for seating the flange on the cylindrical extension 40 of a mandrel 34. The spring pressed ball bearing 44 in extension 40 serves to press against the rim 77 to hold the central part of flange 35 firmly in position on the cylindrical extension. A series of radially extending sloping ribs 78, integrally formed in or molded with the body of the disc, are preferably provided to support the hub 76 and the annular rim 77.

As shown in FIG. 8, the end of the cylindrical hub 76 is provided with a number of annular steps successively decreasing in diameter toward the internal diameter 79 of the hub.

The internal diameter of the sleeve or barrel 36 is such as to conform closely to the outer surface of the step of smallest diameter on the end of the hub 76. Thus, it will be seen that as the flange 35 and sleeve approach each other, the sleeve 36 slides over the first step toward and into contact with the riser of the second step. As will be further explained later, the pressure applying the flange 35 to the sleeve and the coaxial rotation of the flange relative to the sleeve produces sufficient heat to soften the polystyrene material of which the flange is made and allow the sleeve to move still further toward the flange to compress the second annular step so as to expand outwardly to merge with the outer surface of the hub. As will be explained later, the rotation of the flange 35 and the pressure applying the flange to the sleeve 36 is instantly stopped at this point in the operation to insure instant cooling and solidification of the polystyrene material resulting in a weld between the flange and the sleeve.

As shown in FIGS. 1 and 2, the apparatus further comprises a box-like unit 80 on the top and at the back of the cabinet 10 in which is contained the necessary electrical equipment, more fully described later, to control the starting of the machine, emergency stopping of the machine, and automatic cycling operation. Also forming a part of the control equipment are two microswitches 88, one for each mandrel assembly 17 and 18. As shown more clearly in FIG. 3A, each microswitch 88 is contained in a shell or housing 89 that is attached to the side of the base 22 on which the mandrel housing 20 rests. Each microswitch 88 has an operating finger 90 that is shifted by movement of the base 22 relative to a rod 85. As seen in FIGS. 1 and 2, each rod 85 has a knurled portion at one end and threads ($\frac{3}{8}$–24 S.A.E.O at the other end for engaging in a tapped bore in the bracket 67 attached to the vertical plate of associated cradle member 48 or 49. For a reason which will be understood later, the threads on rod 85 enable the rod to be adjusted laterally relative to the cradle member (48 or 49) by rotating the rod. Each rod 85 has a portion of reduced diameter with conical shoulders or ramps 91 at the opposite ends which are selectively engaged by the finger 90 of the microswitch depending upon the degree and direction of movement of the base 22 of the mandrel assembly carrying the microswitch. A pair of annular bushings 92 are provided at opposite sides of housing 89, through which rod 85 extends, for supporting and guiding the movement of housing 89 relative to the stationary rod 85. The microswitch 88 will be identified later on in connection with a description of the control equipment as limit switches LS1 and LS2 for mandrel assemblies 17 and 18 respectively.

As a preface to a description of the control equipment in FIG. 9 and its automatic cycling operation, let it first be assumed that a flange 35 has been installed in manner shown in FIG. 8 on the mandrel 34 of each mandrel assembly 17 and 18 and that a sleeve 36 of appropriate length has been installed in horizontal position in the cradle members 48 and 49 between the flanges. When the sleeve 36 is first placed in the gripping member 57, the left end of the sleeve is placed against a stop surface which insures that when the sleeve is swung upwardly by the arm 61, the sleeve is appropriately positioned relative to the flange 35 installed on the mandrel 34 of the left-hand mandrel assembly 17. Assuming further that the necessary electrical power and air pressure is available and ready, it is now in order to start the motors M-1 and M-2 (FIG. 9) by depressing, that is closing, the "start" switch of the motor starter 81, which energizes starting relay M and causes the contacts of the starting relay M to close and supply current from the 3 phase, 230 volt, 60 cycle AC lines to the motors 28. For convenient reference, the two motors 28 for the mandrel assemblies 17 and 18 are designated M-1 and M-2 respectively, in FIG. 9.

At the same time, a transformer CT is connected to the AC supply lines and the secondary winding is activated to supply a lower voltage, for example 110 volts, to a secondary circuit. One line 82 of the secondary circuit is grounded at 83 and the other line 84 is the "hot" line.

With the two motors M-1 and M-2 rotating, the operator may now depress, that is close, the two switches marked "cycle." These switches have mushroom push button heads, visible as such on opposite sides of the unit 80 in FIG. 1, thus insuring that both hands of the operator are required to depress the switches simultaneously and safely clear of rotating parts of the machine.

A main relay MR in the secondary circuit is energized by simultaneous closure of the two normally open "cycle" switches. Also in this circuit is a normally closed switch, designated "Emer. Stop." This switch has a mushroom push button visible, in FIG. 1, on the top of the unit 80. Main relay MR is energized via a circuit from the hot line 84, closed "Emerg. Stop" switch, the two "cycle" switches in series, a normally closed contact TDR1 of a time delay pickup relay TDR, and the winding of relay MR.

Two relays, designated 1CR and 2CR are energized upon pick-up of relay MR, via a circuit extending from hot line 84, a normally open contact MR2 of relay MR, two limit switches designated LS1 and LS2 and the windings of relays 1CR and 2CR to the grounded wire 82. The limit switches LS1 and LS2 are respectively activated from a normally closed position to an open position upon a predetermined amount of travel of mandrel assemblies 17 and 18 toward each other, as more full explained hereafter. As previously described, these limit switches are microswitches that are activated by movement relative to rod 85 (FIG. 1) which remains stationary.

Upon pick-up of relays 1CR and 2CR due to their energization, corresponding normally open contacts 1CR1 and 2CR1 thereof become closed and maintain the latching or holding circuit through the winding of main relay MR. As before indicated, the initial latching circuit path is through normally closed contact TDR1, which upon the elapse of a predetermined time opens, allowing contacts 1CR1 and 2CR1 to deenergize relay MR as explained hereafter.

Immediately upon the closure of contact MR2, solenoid valve S2 is energized to supply air under pressure to the clamp cylinders 66. This sequence will be explained in depth later. Also picked-up, after a predetermined time delay, due to energization thereof by closure of contact MR2 is the time delay pick-up relay TDR.

As previously indicated, the central housing 20 of each of the mandrel assemblies contains a control unit 31. These control units are Warner Control Units, model MCS 103 which control the energization and deenergization of the brake 32 and clutch 33 thereof. Details of the control units 31 are omitted, as they are a purchased item and an understanding thereof is not required to explain the further operation of the machine. However, it should be understood that each control unit 31 comprises a series of terminals numbered 1 to 7, to which connections from the brake 32 and clutch 33 of each unit are made. Also the secondary 110 volt circuit is connected to two of the terminals 1 and 2 of each unit. The control unit 31 includes a rectifier (not shown) for converting the 110 volts AC input to a 90 volt D.C. employed to actuate the brake and the clutch.

Upon pick-up of the two relays 1CR and 2CR as described, the opening of the corresponding normally-closed contacts 1CR3 and 2CR3 of the control units causes release of the respective brakes 32 from the shafts 23a and the closure of contacts 1CR4 and 2CR4 causes engagement of the clutches 33, thereby causing the respective shafts 23a and the mandrel 34 to rotate. As previously stated, the arrangement of the drives from motors 28 to shafts 23 is such that the shafts 23a of the two mandrel assemblies 17 and 18 rotate respectively in opposite directions.

With air under pressure supplied to cylinders 66 of the clamps 63 as described earlier, the jaws 64 of the clamps are activated into position for a firm grip on the barrel or sleeve 36 which is in proper position between the rotating flanges.

Since the relay TDR is a time-delay pick-up relay, a predetermined time elapses before the solenoid valve S1 is energized, via contact TDR2, to supply air under pressure to air cylinders 56 of the two mandrel assemblies, thereby causing the rotating reel flanges 35 to move toward the stationary reel barrel or sleeve 36. Sleeve 36 consequently enters the stepped end portion of the hub 76 on each flange as previously described.

Accordingly, due to the heat of friction developed, the annular step on the end of hub 76 in the flanges 35 softens and melts, thus allowing the two opposed flanges to move closer together to attain the proper spool width. This spool width is controlled by the two limit switches LS1 and LS2. When the mandrel assemblies carrying the flanges 35 travel a distance sufficient to open the limit switches, the flanges stop rotating which allows the sleeve 36 and the flanges 35 to fuse together or solidify.

The opposed mandrel assemblies 17 and 18 do not necessarily actuate their respective limit switches LS1 and LS2 to open position at the same time. However each mandrel assembly must hold position until the flanges carried on both mandrels have welded to ensure proper and even pressure for both flanges. This is accomplished electrically due to the fact that relay MR is maintained energized, or latched, by contacts 1CR1 and 2CR1 independently of each other. In other words relay MR is deenergized only when both relays 1CR and 2CR are deenergized by their perspective limit switches LS1 and LS2, thereby opening contacts 1CR1 and 2CR1.

If limit switch LS1 opens before LS2, then switch LS1 deenergizes relay 1CR. In turn, clutch 33 of the corresponding control unit 31 is deenergized and brake 32 of the same control unit 31 becomes energized. Thus the flange stops rotating and remains in that position until the opposite flange actuates its limit switch LS2. When limit switch LS2 opens, relay 2CR is deenergized, thereby deenergizing the clutch 33 and energizing the brake 32 of the corresponding mandrel assembly which results in the mandrel 34 stopping.

With both relays 1CR and 2CR deenergized, and contact TDR1 open, the relay MR becomes deenergized or unlatched. With relay MR deenergized, contact MR2 opens and thereby deenergizes solenoid valves S1 and S2. This releases air under pressure from cylinders 56 and reverses air flow to cylinders 66. Reversing the air flow to cylinders 66 causes the clamps 63 to release their hold on the barrel or sleeve 36. At the same time, when relays 1CR and 2CR are deenergized, the contacts 1CR2 and 2CR2 thereof are restored to a closed position, thereby effecting energization of solenoid valve S3. Energization of solenoid valve S3 causes air under pressure to be supplied to cylinders 56 so that the mandrel assemblies are restored to their retracted or loading position. The completed reel or spool may now be removed from the machine by pulling the arm 61 of the gripping member 57 back to its lowered position. The machine is now ready to be reloaded and recycled.

When the emergency stop push button on box-like unit 80 is depressed, the relay MR is deenergized. Thus, the mandrels are immediately stopped and retracted to their open position for loading, in the same manner as at the end of a cycle of operation previously described.

It will thus be seen that we have provided a machine for friction welding the flanges to the opposite ends of the barrel of a spool or reel of polystyrene materials on which to wind cord, wire cable and the like. While we have shown and described a specific and preferred embodiment of the machine it should be understood that variations and modifications of the embodiment shown and described are possible within the terms of the appended claims.

I claim:

1. A method for bonding the end flanges to the intervening sleeve of a spool of plastic material comprising the steps of;
   (a) holding the sleeve immobile against axial rotation,
   (b) rotating the flanges in coaxial spaced relation independently of each other in opposite directions at corresponding relatively low speeds respectively, said flanges each having a central annular hub the outer end of which hub is formed with a series of annular steps of successively decreasing diameter toward the end,
   (c) moving the outer end of the hubs of the flanges into telescoping contact with the opposite ends of the sleeve while continuing to rotate the flanges and while exerting a substantially uniform pressure to both flanges to cause the sleeve to slide over one step of smaller diameter and compress the succeeding step of larger diameter so as to expand it in diameter before relieving the pressure applying the flanges to the sleeve, and
   (d) stopping the rotation of said flanges and relieving the pressure applying them to the sleeve upon a predetermined axial movement of said flanges toward the sleeve after the initial contact thereof with the sleeve.

2. A method for bonding the end flanges to the intervening sleeve of a spool of plastic material comprising the steps of;
   (a) holding the sleeve immobile against axial rotation,
   (b) rotating the flanges in coaxial spaced relation independently of each other in opposite directions at corresponding relatively low speeds respectively, said flanges each having a central annular hub the outer end of which hub is formed with a series of annular steps of successively decreasing diameter toward the end,
   (c) moving the outer end of the hubs of the flanges into telescoping contact with the ends of the sleeve while continuing to rotate the flanges and while exerting a substantially uniform pressure to both flanges to cause the sleeve to slide over one step of smaller diameter and compress the succeding step of larger diameter so as to expand it in diameter before relieving the pressure applying the flanges to the sleeve, and
   (d) stopping the rotation of said flanges and relieving the pressure applying them to the sleeve upon a predetermined axial movement of said flanges toward the sleeve after the initial contact thereof with the sleeve.
the said predetermined axial movement of said flanges toward the said sleeve after the initial contact thereof corresponding to the degree of compression of the succeeding step of larger diameter and being in the range of 1/32 of an inch to 1/16 of an inch.

3. Apparatus for friction welding a pair of end flanges to the opposite ends of an intervening sleeve of a spool of plastic material, comprising:
   (a) means for holding a sleeve immobile in a fixed non-rotative position, comprising cradle members and fluid pressure actuated clamping means for holding said sleeve firmly in said cradle members,
   (b) a pair of mandrel assemblies arranged for movement in opposite directions on a common line in coaxial spaced relation to each other and in coaxial relation to said sleeve,
   (c) a mandrel on each of said mandrel assemblies for holding a flange thereon in a position normal to the axis of rotation of said mandrel,
   (d) means for simultaneously rotating the mandrels, with flanges respectively mounted thereon, while moving them toward each other with a uniform fluid pressure until the flanges contact the ends of the immobile sleeve,
   (e) means responsive to a predetermined axial movement of the said flanges after they contact the ends of the sleeve for instantly stopping the rotation of the mandrels, and for then effecting a reversal of the fluid pressure thereon to cause retraction thereof,
   (f) a member of substantially U-shape in which a sleeve is first deposited and which peripherally grips the sleeve,
   (g) means mounting said gripping member for pivotal movement in a vertical plane, and
   (h) means attached to said gripping member for manually swinging said gripping member to an inverted position in which said sleeve drops into said cradle members.

4. Apparatus for friction welding a pair of flanges to the opposite ends of an intervening sleeve of a spool of plastic material comprising:
   (a) means for holding a sleeve immobile in a fixed non-rotative position, comprising cradle members and fluid pressure actuated clamping means for holding said sleeve firmly in said cradle members,
   (b) a pair of mandrel assemblies arranged for movement in opposite directions on a common line in coaxial spaced relation to each other and in coaxial relation to said sleeve,
   (c) a mandrel on each of said mandrel assemblies for holding a flange thereon in a position normal to the axis of rotation of said mandrel,
   (d) means for simultaneously rotating the mandrels, with flanges respectively mounted thereon, while moving them toward each other with a uniform fluid pressure until the flanges contact the ends of the immobile sleeve,
   (e) means responsive to a predetermined axial movement of the said flanges after they contact the ends of the sleeve for instantly stopping the rotation of the mandrels, and for then effecting a reversal of the fluid pressure thereon to cause retraction thereof,
   (f) a member of substantially U-shape in which a sleeve is first deposited and which peripherally grips the sleeve,
   (g) means mounting said gripping member for pivotal movement in a vertical plane,
   (h) means attached to said gripping member for manually swinging said gripping member to an inverted position in which said sleeve drops into said cradle members,
   (i) and stop means engageable by one end of a sleeve when deposited in said gripping member to fix the longitudinal position of the sleeve when deposited in said cradle members.

5. Apparatus for friction welding a pair of flanges to the opposite ends of an intervening sleeve of a spool of plastic material comprising:
 (a) means for holding a sleeve immobile in a fixed non-rotative position, comprising cradle members and fluid pressure actuated clamping means for holding said sleeve firmly in said cradle members,
 (b) a pair of mandrel assemblies arranged for movement in opposite directions on a common line in coaxial spaced relation to each other and in coaxial relation to said sleeve,
 (c) a mandrel on each of said mandrel assemblies, each of which mandrels comprises a metallic disc having a central cylindrical boss and a plurality of pins in radially spaced relation to said boss longitudinally extending from one face thereof on which to carry a flange, and latching means cooperating with a central opening in said flange to hold said flange on said boss in a position normal to the axis of rotation of said mandrel,
 (d) means for simultaneously rotating the mandrels, with flanges respectively mounted thereon, while moving them toward each other with a uniform fluid pressure until the flanges contact the ends of the immobile sleeve,
 (e) and means responsive to a predetermined axial movement of the said flanges after they contact the ends of the sleeve for instantly stopping the rotation of the mandrels, and for then effecting a reversal of the fluid pressure thereon to cause retraction thereof.

* * * * *

UNITED STATES PATENT AND TRADEMARK OFFICE
CERTIFICATE OF CORRECTION

PATENT NO. : 4,252,587
DATED : February 24, 1981
INVENTOR(S) : DAVID R. HARDEN and HUGH E. SOUTHERLAND It is certified that error appears in the above-identified patent and that said Letters Patent are hereby corrected as shown below:

Column 1, line 52, the period "." should be changed to a comma -- , --.

Column 1, line 56, the period "." should be changed to a comma -- , --.

Column 1, line 57, "elevation" should be --elevational--.

Column 1, line 58, the period "." should be changed to a comma -- , --.

Column 1, line 62, "of polystyrene" should read --of a polystyrene--.

Column 5, line 8, "assembly which" should read --assembly to which--.

Claim 2, column 9, line 60, the period "." should be changed to a comma --,--.

Signed and Sealed this

Twenty-sixth Day of May 1981

[SEAL]

Attest:

RENE D. TEGTMEYER

Attesting Officer     Acting Commissioner of Patents and Trademarks